United States Patent
Umemoto et al.

(10) Patent No.: US 6,449,933 B1
(45) Date of Patent: Sep. 17, 2002

(54) LAWN MOWER

(75) Inventors: Hideya Umemoto, Sakai; Yoshikazu Togoshi, Osaka; Masahiro Yamada; Yoshiyuki Esaki, both of Sakai; Akira Minoura, Osaka; Kazuo Samejima, Kaizuka, all of (JP)

(73) Assignee: Kuboto Corporation (JP)

( * ) Notice: Subject to any disclaimer, the term of this patent is extended or adjusted under 35 U.S.C. 154(b) by 0 days.

(21) Appl. No.: 09/789,488

(22) Filed: Feb. 20, 2001

(30) Foreign Application Priority Data

Sep. 29, 2000 (JP) ........................................ 2000-300128
Sep. 29, 2000 (JP) ........................................ 2000-300132

(51) Int. Cl.⁷ ........................... A01D 61/00; B60K 17/30
(52) U.S. Cl. ........................................ 56/13.3; 180/256
(58) Field of Search ............................. 56/10.8, 11.1, 56/11.3, 11.8, 11.9, 13.3, 13.5, DIG. 15, 229; 180/6.26, 6.34, 6.48, 252, 253–257, 260, 900; 280/98, 760, 776

(56) References Cited

U.S. PATENT DOCUMENTS

| | | | |
|---|---|---|---|
| 4,395,865 A | 8/1983 | Davis, Jr. et al. ............. | 56/13.3 |
| 4,782,650 A | 11/1988 | Walker ......................... | 56/16.6 |
| 5,193,882 A | 3/1993 | Gamaldi ....................... | 298/11 |
| 5,247,784 A * | 9/1993 | Kitamura et al. ............. | 56/10.8 |
| 5,515,669 A | 5/1996 | Schick et al. ................ | 56/15.7 |
| 5,667,032 A * | 9/1997 | Kamlukin ..................... | 180/256 |
| 5,826,416 A | 10/1998 | Sugden et al. .............. | 56/320.2 |
| 5,947,219 A | 9/1999 | Peter et al. ................. | 180/68.1 |
| 6,082,084 A * | 7/2000 | Reimers et al. .............. | 56/11.9 |
| 6,244,370 B1 * | 6/2001 | Peter .......................... | 180/374 |

* cited by examiner

Primary Examiner—Robert E. Pezzuto
(74) Attorney, Agent, or Firm—Webb Ziesenheim Logsdon Orkin & Hanson, P.C.

(57) ABSTRACT

A lawn mower with a vehicle body; an engine mounted on the vehicle body; caster-type front wheels; a rear wheel unit having a left rear drive wheel and a right rear drive wheel; a mower unit disposed between the front wheels and rear wheel unit; a left stepless transmission for transmitting drive, switched between forward drive and backward drive, to the left rear wheel; and a right stepless transmission for transmitting drive, switched between forward drive and backward drive, to the right rear wheel; wherein the right and left stepless transmissions are operable independently of each other. A caster-type auxiliary ground wheel unit (9) is disposed rearwardly of the rear wheel unit and supported by a support member (24) to be vertically movable relative to the vehicle body. A braking mechanism (30) is provided for braking an upward movement of the support member.

12 Claims, 13 Drawing Sheets

LAWN MOWER

BACKGROUND OF THE INVENTION

1. Field of the Invention

This invention relates to a lawn mower with a vehicle body; an engine mounted on the vehicle body; caster-type front wheels; a rear wheel unit having a left rear drive wheel and a right rear drive wheel; a mower unit disposed between the front wheels and rear wheel unit; a left stepless transmission for transmitting drive, switched between forward drive and backward drive, to the left rear wheel; and a right stepless transmission for transmitting drive, switched between forward drive and backward drive, to the right rear wheel; wherein the right and left stepless transmissions are operable independently of each other.

2. Description of the Related Art

A lawn mower of this type has an advantage that the vehicle body turns with a small radius about a middle position between the right and left rear wheels when the rear wheels are driven to rotate at the same speed in opposite directions. However, as the center of gravity of the vehicle body is located relatively rearwardly, a lawn mower has been developed which has an auxiliary ground wheel fixed to the rear of the vehicle body for contacting the ground rearwardly of the rear wheels. This construction prevents lifting of the front of the vehicle body to avoid poor grass cutting results.

Such an auxiliary ground wheel fixed to the vehicle body could adversely affect the running performance of the lawn mower, depending on the position or support structure of the auxiliary ground wheel. For example, the auxiliary ground wheel impairs the turning performance of the vehicle and tends to produce body vibration during a run.

SUMMARY OF THE INVENTION

The object of this invention is to provide a lawn mower with an auxiliary ground wheel mounted in a manner not adversely affecting its running performance.

In order to achieve the above object, with a lawn mower set forth at the outset hereof, this invention provides a caster-type auxiliary ground wheel unit disposed rearwardly of the rear wheel unit and supported by a support member to be vertically movable relative to the vehicle body, and a braking mechanism for braking an upward movement of the support member.

With a rigidly fixed auxiliary ground wheel not vertically movable relative to the vehicle body, a strong reaction force acts on the auxiliary ground wheel when the vehicle goes up a sloping terrain. This reaction force from the ground constitutes a resistance to vehicle movement. In the worst case, the vehicle is unable to advance to the sloping terrain. According to this invention, the auxiliary ground wheel is movable up and down through the support member so that an upward movement of the auxiliary ground wheel prevents excessive reaction forces from generating when the vehicle travels on a sloping terrain. With a structure for allowing free vertical movements of the auxiliary ground wheel, the auxiliary ground wheel does not support the rear portion of the vehicle body for stable running, as a matter of course. The braking mechanism acts to produce a predetermined supporting force.

Preferably, this braking mechanism is provided in the form of a biasing mechanism, and more preferably in the form of a suspension spring, to bias the auxiliary ground wheel downward. When the vehicle travels on an uneven terrain, the auxiliary ground wheel is raised relative to the vehicle body by a reaction force from the ground, and at the same time lowered relative to the vehicle body by the suspension spring. Thus, the auxiliary ground wheel keeps contact with the ground while the vehicle travels over an uneven terrain. When the vehicle advances to an uphill terrain, the auxiliary ground wheel is raised relative to the vehicle body by a reaction force from the ground. As a result, the vehicle body is kept in contact with the ground by the auxiliary ground wheel, while preventing the generation of body vibration and changes in the body orientation caused by ups and downs of the auxiliary ground wheel. When the mower travels over an uneven terrain, and the auxiliary ground wheel is prevented from acting as a traveling resistance which would not allow the vehicle to advance to an uphill ground.

In a preferred embodiment of the invention, the auxiliary ground wheel unit includes a plurality of auxiliary ground wheels arranged transversely of the vehicle body. The plurality of auxiliary ground wheels arranged in the right and left direction increase the width of contact with the ground. This contributes to stable traveling of the vehicle by contacting the ground in a plurality of locations, and by preventing the auxiliary ground wheel unit from falling into hollows of the ground. As a result, with the auxiliary ground wheel unit having a stable contact with the ground, the orientation of the vehicle body is stabilized to improve grass cutting quality.

In another preferred embodiment of the invention, the support member includes a proximal arm portion extending longitudinally of the vehicle body and laterally outwardly of the engine and having a front end thereof connected to a body frame to be pivotable about an axis extending transversely of the vehicle body, and a distal arm portion extending transversely of the vehicle body from a rear end of the proximal arm portion, with an extended end having the auxiliary ground wheel unit attached thereto. With this construction, even when the mower draws too close to a tree or the like, the proximal arm portion extending laterally of the engine protects the engine from directly striking the tree or the like. In other words, the support member acts as a protector for the engine.

The proximal arm portion of the support member may be disposed laterally of the vehicle body opposite from a side where a blower is disposed for transmitting grass clippings into a grass catcher. Then, the proximal arm portion of the support member is allowed to move up and down through an increased range without interfering with the blower.

When the lawn mower engages in an operation, turning around a tree or the like, the side having a grass outlet of the mower unit lies outwardly of the turning circle. Where the proximal arm portion of the support member is disposed laterally of the vehicle body opposite from the side where the grass outlet of the mower unit is disposed, the support member lies inwardly of the turning circle. Thus, the support member acts as a protector to keep the engine out of direct contact with the tree or the like when the mower draws too close to the tree or the like.

In yet another preferred embodiment of the invention, the auxiliary ground wheel unit is disposed such that the auxiliary ground wheel unit describes a turning track within a maximum turning track of the lawn mower when the right and left rear wheels are driven at an equal speed in opposite directions to steer the vehicle body. If the auxiliary ground wheel described a maximum turning track of the mower when the vehicle body is steered by driving the right and left rear wheels at the same speed in opposite directions, the auxiliary ground wheel would be liable to strike an obstacle such as a tree or a wall as an operator operates and turns the mower around the obstacle while looking ahead. However, the aforesaid structure eliminates the possibility that the carelessness of the operator causes the auxiliary ground wheel to strike an obstacle. The operator has only to pay attention to the most forwardly projecting part of the mower.

Furthermore, from the viewpoint of the operator skill in driving the lawn mower, it will be convenient if the auxiliary ground wheel unit is disposed such that the auxiliary ground wheel unit describes a turning track not exceeding a turning radius of the right and left rear wheels when the right and left rear wheels are driven at an equal speed in opposite directions to steer the vehicle body. With this structure in which the auxiliary ground wheel unit turns with a radius not exceeding that of the right and left rear wheels, the auxiliary ground wheel will have no possibility of colliding with an obstacle as long as the operator turns the lawn mower near the obstacle with care so that the rear wheels move clear of the obstacle.

It will also be convenient if the auxiliary ground wheel unit is disposed such that the auxiliary ground wheel unit describes a turning track not exceeding a turning radius of the front wheels when the right and left rear wheels are driven at an equal speed in opposite directions to steer the vehicle body. With this structure in which the auxiliary ground wheel unit turns with a radius not exceeding that of the right and left front wheels, the auxiliary ground wheel will have no possibility of colliding with an obstacle as long as the operator turns the lawn mower near the obstacle with care so that the front wheels move clear of the obstacle.

Other features and advantages of this invention will be apparent from the following description of the embodiment to be taken with reference to the drawings.

DESCRIPTION OF THE PREFERRED EMBODIMENT

Figure 1:
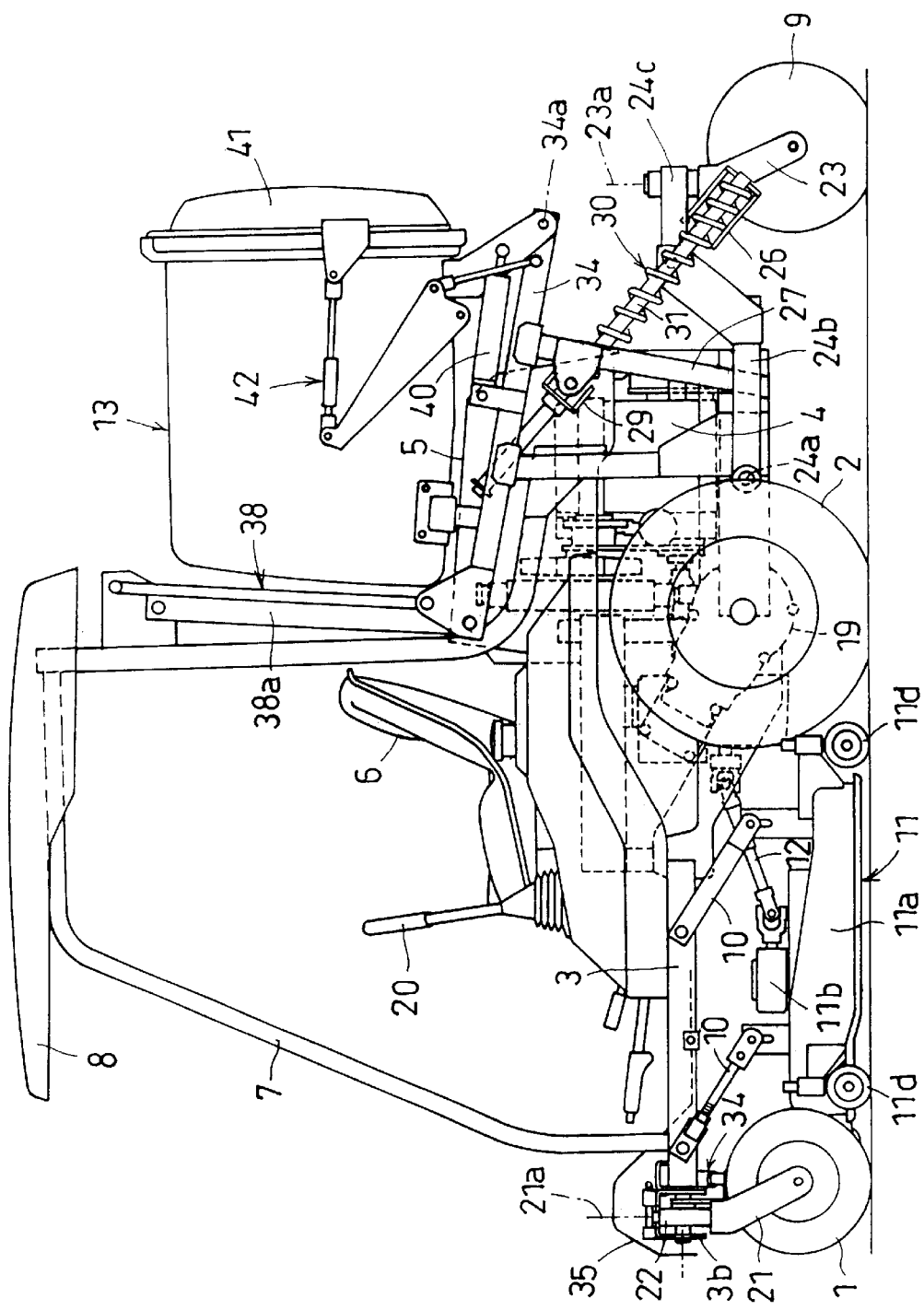
FIG. 1 is a side elevation of a lawn mower in one embodiment of this invention.

As shown in FIGS. 1 through 4, a lawn mower has a pair of freely rotatable caster-type right and left front wheels 1 and a pair of right and left rear drive wheels 2 supporting a body frame 3. An engine 4 is mounted on a rear portion of the body frame 3 so that the engine 4 is positioned rearwardly of the axis of rear wheels 2. A motor section including an engine hood 5 covering the engine 4 is mounted on the rear portion of the body. A driving platform is disposed forwardly of the motor section. The driving platform includes a driver's seat 6 placed slightly forwardly of and above a position between the right and left rear wheels 2 forming a rear wheel unit, a driving platform frame 7 covering a driver accommodating space, and a sun shade 8 supported by the platform frame 7. A caster-type auxiliary ground wheel 9 is disposed rearwardly of the vehicle body, to act as an auxiliary wheel unit for contacting the ground in a location rearwardly of the rear wheels 2.

A mower unit 11 is suspended between the front and rear wheels from a pair of pivot links 10 vertically pivotably supported by the body frame 3. The torque from the engine 4 is transmitted through a rotary shaft 12 to an input case 11b disposed on a top panel of a mower deck 11a to drive rotary cutting blades arranged in the mower deck 11a transversely of the vehicle body.

Figure 4:
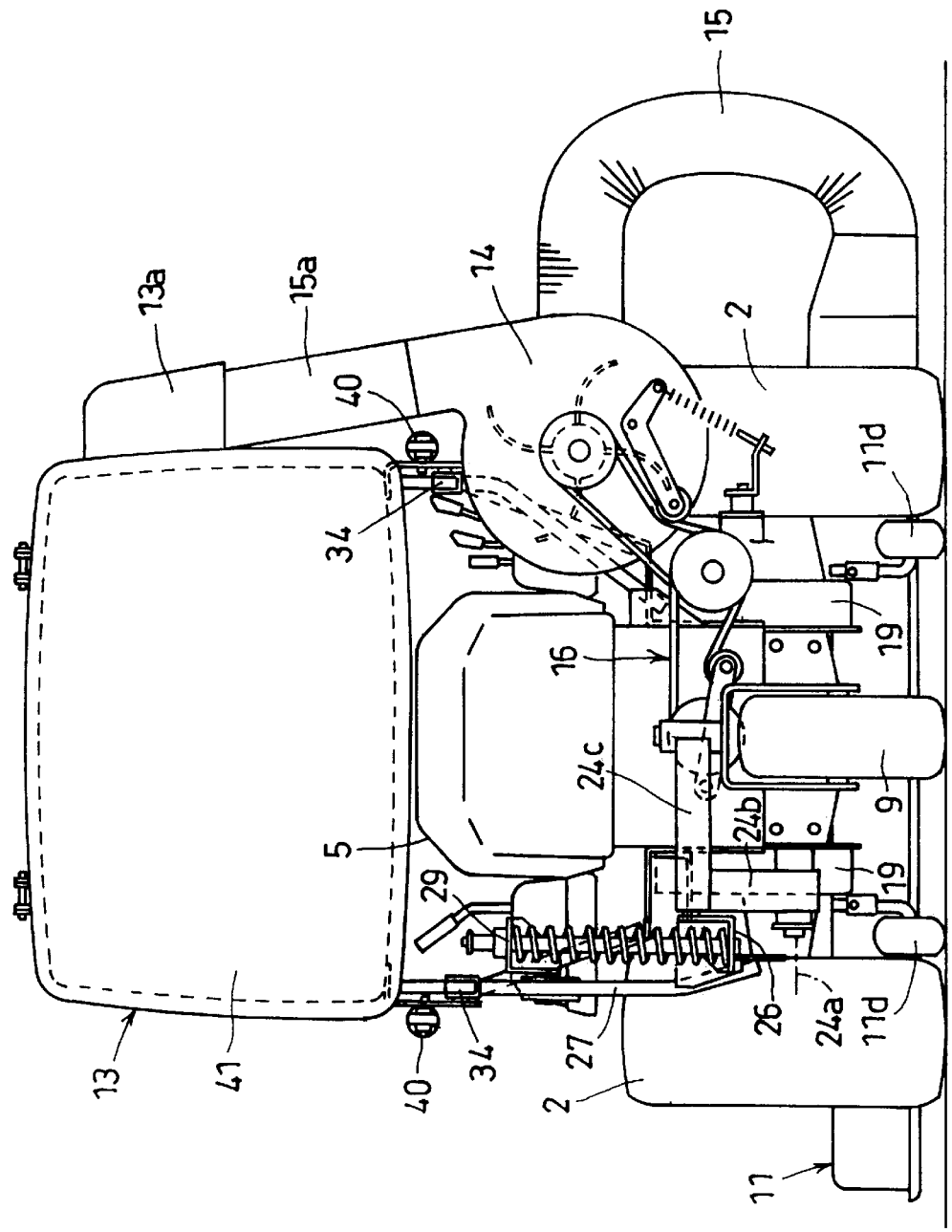
FIG. 4 is a rear view of the lawn mower.

A grass catcher 13 is carried above the motor section, and a grass receiving part 13a disposed laterally of the grass catcher 13 as shown in FIG. 4 is connected through a transport duct 15 to a grass outlet 11c disposed at a lateral end of the mower deck 11a of mower unit 11. The transport duct 15 has a blower 14 disposed in an intermediate position thereof and laterally outward from the engine 4.

This mower is intended mainly for use in a grass cutting operation. The mower travels with the mower unit 11 lowered to a working level at which gauge wheels 11d attached outside the mower deck 11a contact the ground. Lawn or grass is cut by the rotary blades rotating in the mower unit 11, and grass clippings are discharged into the transport duct 15 by carrier air currents generated by the rotation of the blades. As the blower 14 is driven by torque transmitted from an output unit at the rear of engine 4 through a belt transmission mechanism 16, the grass clippings are transported from the mower unit 11 into a portion of transport duct 15 between the mower unit 11 and the blower 14 and to the sucking end of the blower 14. Further, the grass clippings are transported into the grass catcher 13 through a duct portion 15a extending vertically between the blower 14 and the grass catcher 13.

Figure 3:
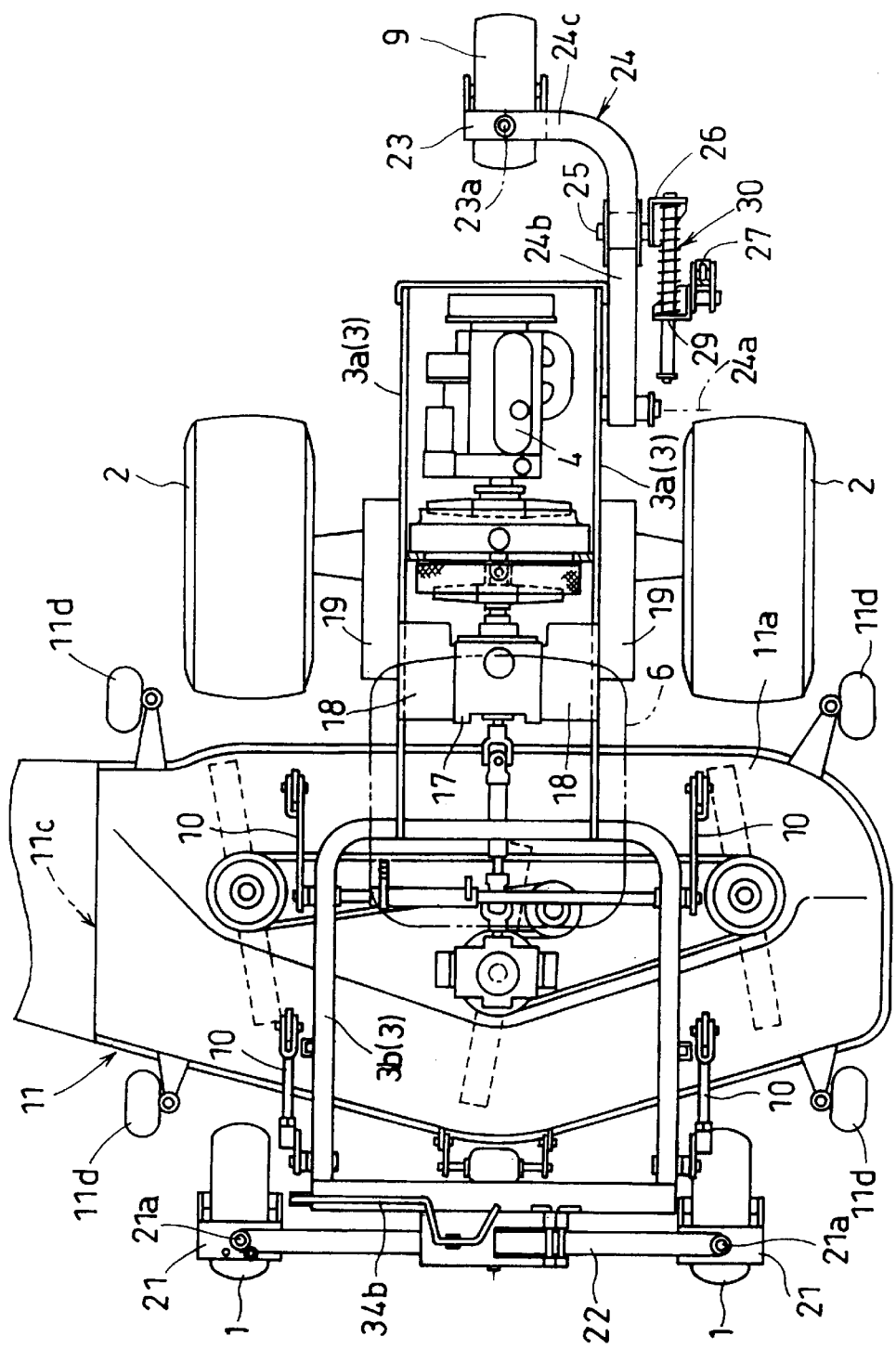
FIG. 3 is a plan view showing a body frame.

As shown in FIG. 3 and so on, torque from a front output part of the engine 4 is transmitted to an input of a transmission 17 mounted to bridge a pair of right and left rearward portions 3a of the body frame 3. Torque from an output of the transmission 17 is transmitted to hydraulic pumps of hydrostatic stepless propelling transmissions 18 attached to opposite sides of the transmission 17, respectively. Torque output of a hydraulic motor of the left one of the two stepless propelling transmissions 18 is transmitted to the left rear wheel 2 through a left reduction case 19. Torque output of a hydraulic motor of the right stepless propelling transmission 18 is transmitted to the right rear wheel 2 through a right reduction case 19. A pair of right and left control levers 20 are arranged at opposite sides of the driver's seat 6 on the driving platform. These control levers 20 are operatively connected to control portions of the stepless propelling transmission 18 for the left rear wheel and the stepless propelling transmission 18 for the right rear wheel, respectively. The lawn mower is driven and steered by rocking these control levers 20 in longitudinal directions of the vehicle body and independently of each other.

Specifically, by rocking the left control lever 20 longitudinally of the vehicle body, the stepless transmission 18 for the left rear wheel is shifted to a forward drive position, a neutral position and a backward drive position to drive the left rear wheel forward, backward and to stop the left rear wheel. By rocking the right control lever 20 longitudinally of the vehicle body, the stepless transmission 18 for the right rear wheel is shifted to a forward drive position, a neutral position and a backward drive position to drive the right rear wheel forward and backward and to stop the right rear wheel. Each of the right and left control levers 20 is rockable the further forward from the neutral position to shift the stepless transmission 18 to the faster forward drive position. Each lever 20 is rockable the further rearward from the neutral position to shift the stepless transmission 18 to the faster backward drive position.

That is, the right and left control levers 20 are operable to control the stepless transmissions 18, respectively, to drive the right and left rear wheels 2 forward or backward or to stop the rear wheels 2. Thus, the vehicle may be driven forward or backward at varied speeds. Furthermore, by changing the driving speed and driving direction of the right and left rear wheels 2, the vehicle may be controlled to run straight or to turn right and left.

As shown in FIGS. 1, 3 and so on, the right and left front wheels 1 are rotatably supported by caster-type front wheel support members 21. The front wheel support members 21 have a front axle member 22 extending therebetween transversely of the vehicle body. Each front wheel support member 21 is supported by a front end portion of the body frame 3 through the front axle member 22 to be pivotable about a steering axis 21a. As a result, the right and left front wheels 1 pivot about the steering axes 21a, together with the front wheel support members 21, when the self-propelled vehicle is steered.

As shown in FIGS. 3, 4 and so on, the auxiliary ground wheel 9 is rotatably supported by a gate-shaped wheel support member 23. The wheel support member 23 is connected to be pivotable about a steering axis 23a to one end of an auxiliary ground wheel support arm 24 acting as an auxiliary ground wheel support member. The other end of the auxiliary ground wheel support arm 24 is pivotally attached to one of the rear portions 3a of the body frame 3. In this embodiment, the auxiliary ground wheel support arm 24 extends longitudinally of the vehicle body and outside along the side of the vehicle body opposite from the side where the grass outlet 11c of mower unit 11 and the blower 14 of transport duct 15 are located. The auxiliary ground wheel support arm 24 includes a proximal arm portion 24b and a distal arm portion 24c. The proximal arm portion 24b has a proximal end thereof connected to an outward surface of the rear frame portion 3a to be pivotable about a transverse axis 24a. The distal arm portion 24c extends from the rear end of the proximal arm portion 24b transversely of the vehicle body toward the engine 4 and to a position rearwardly of the engine 4, with an extended portion thereof supporting the auxiliary ground wheel 9 through the wheel support member 23.

Figure 6:
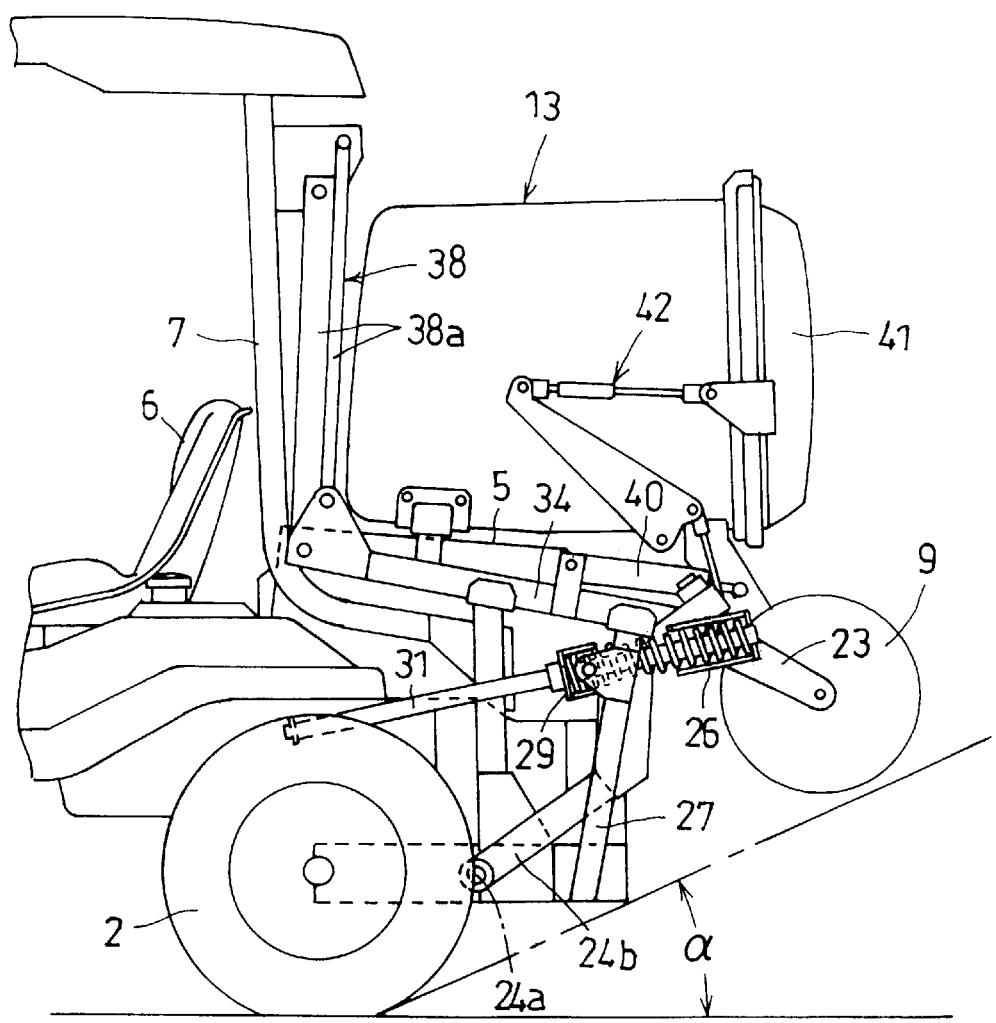
FIG. 6 is a side view showing an auxiliary ground wheel in a raised position.

As a result, with a vertical pivotal movement of the auxiliary ground wheel support arm 24, the auxiliary ground wheel 9 is pivotable vertically relative to the vehicle body to be movable upward by a departure angle: ?? or more of the self-propelled vehicle as shown in FIG. 6. When the vehicle is steered, the auxiliary ground wheel 9 is pivotable with the wheel support member 23 about the steering axis 23a to change directions.

Figure 5:
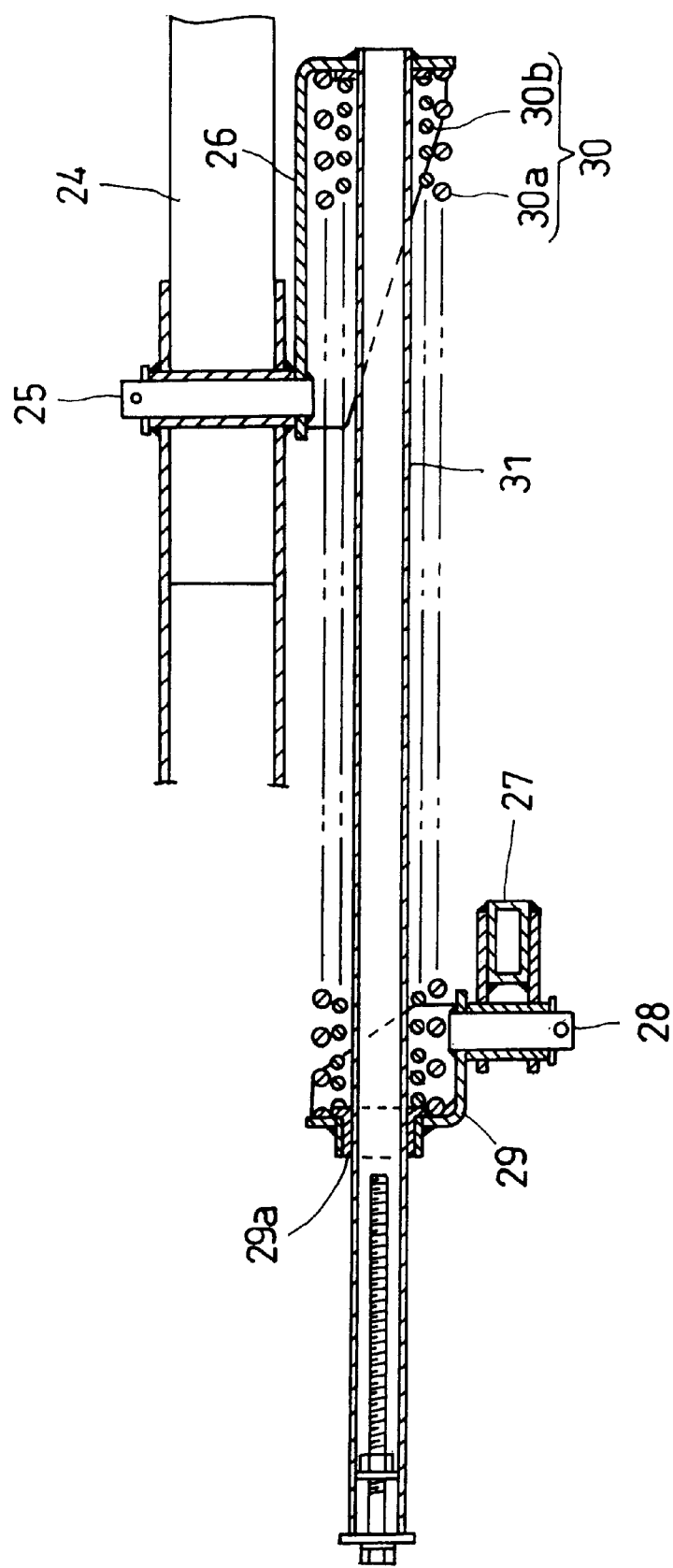
FIG. 5 is a sectional view of a suspension spring.

As shown in FIGS. 1, 3, 5 and so on, a suspension spring 30 is mounted between a spring bearing 26 on the auxiliary ground wheel side and a spring bearing 29 on the vehicle body side. The spring bearing 26 is pivotably connected by a connecting pin 25 to an intermediate position of the proximal arm portion 24b of the auxiliary ground wheel support arm 24. The spring bearing 29 is pivotably connected by a connecting pin 28 to a pole 27 supported by the rear portion 3a of the body frame 3. The suspension spring 30 consists of two coil springs 30a and 30b of different outside diameters disposed coaxially, one within the other. The suspension spring 30, the spring bearing 26 on the auxiliary ground wheel side and the spring bearing 29 on the body side are held by a spring holder 31 extending through the suspension spring 30. One end of the spring holder 31 is fixed to the spring bearing 26 on the auxiliary ground wheel side, while the other end slidably extends through a support portion 29a of the spring bearing 29 on the body side.

The suspension spring 30 biases the auxiliary ground wheel support arm 24 downward through the spring bearing 26 on the auxiliary ground wheel side, while being reinforced by the spring holder 31 against yielding, and utilizing the spring bearing 29 on the body side as an reaction member. Consequently, the auxiliary ground wheel 9 is biased downward. At the same time, the suspension spring 30 is resiliently compressed by a ground reaction force acting on the auxiliary ground wheel 9 and transmitted to the spring bearing 26 on the auxiliary ground wheel side through the auxiliary ground wheel support arm 24. Thus, the suspension spring 30 allows the auxiliary ground wheel support arm 24 to pivot upward, while applying a predetermined braking force thereto, to raise the auxiliary ground wheel 9.

When the terrain is uneven or the vehicle body inclines forward or rearward, a reaction force from the ground raises the auxiliary ground wheel 9 relative to the vehicle body against the force of suspension spring 30, or the suspension spring 30 lowers the auxiliary ground wheel 9 relative to the vehicle body. Thus, the auxiliary ground wheel 9 follows and keeps contact with the ground, while protecting the vehicle from vibration or changes in orientation, which contributes to the traveling stability of the vehicle.

Figure 2:
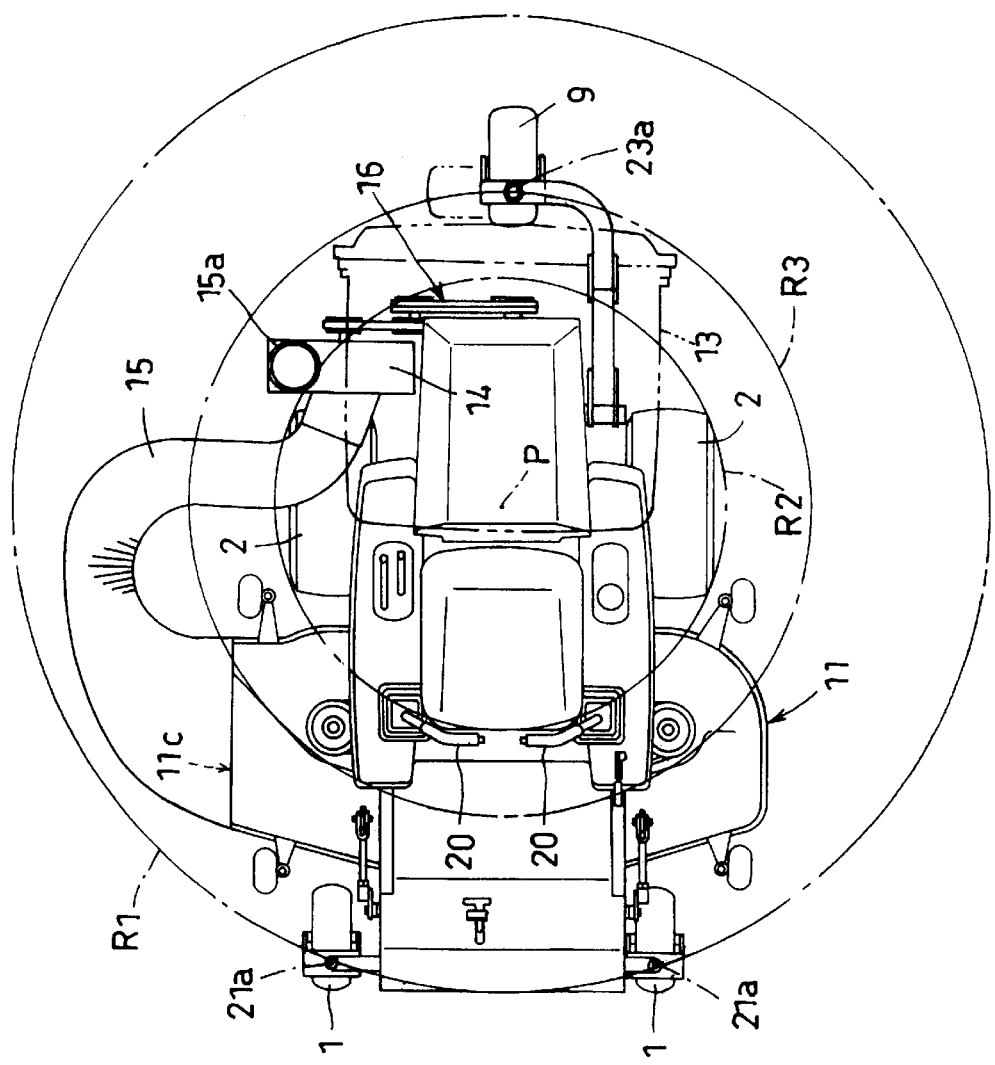
FIG. 2 is a plan view of the lawn mower.

The auxiliary ground wheel 9 is disposed such that the front wheels 1, rear wheels 2 and the auxiliary ground wheel 9 have turning radii in a relationship as shown in FIG. 2. When the right and left rear wheels 2 are driven at the same speed in opposite directions to steer the vehicle body so as to turn about the center P which is a middle position between the right and left rear wheels on the rear wheel axes in plan view, the right and left front wheels 1 turn with a radius R1 which is a linear distance between the turn center P and the steering axes 21a. The right and left rear wheels 2 turn with a radius R2, and the auxiliary ground wheel 9 turns with a radius R3 which is a linear distance between the turn center P and the steering axis 23a. The turning radius R3 of the auxiliary ground wheel 9 is larger than the turning radius R2 of the right and left rear wheels and smaller than the turning radius R1 of the right and left front wheels 1. Naturally, the auxiliary ground wheel 9 is disposed such that the turning track thereof is within a maximum turning track of the lawn mower when the vehicle body is steered by driving the right and left rear wheels at the same speed in opposite directions.

Figure 7:
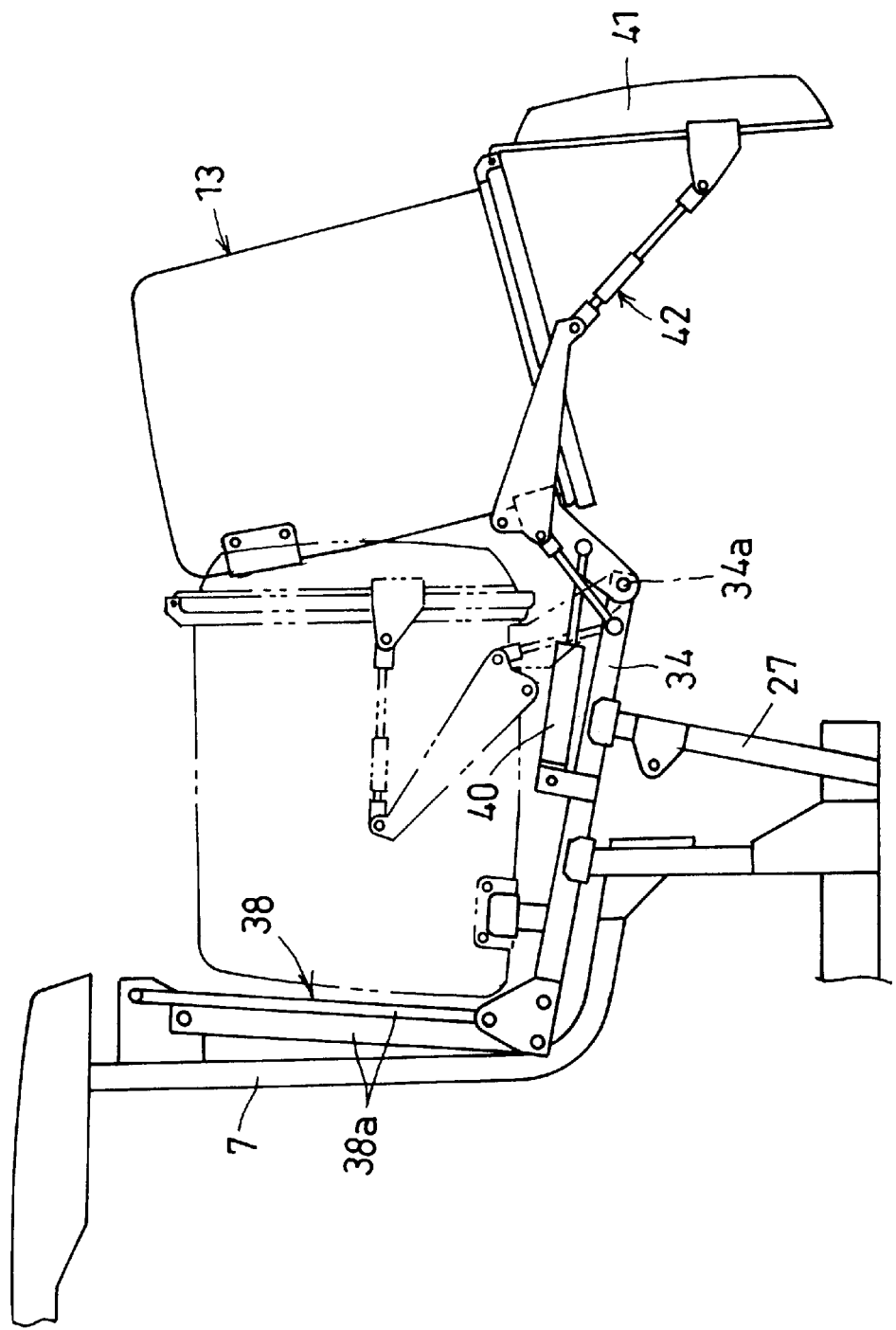
FIG. 7 is a side view of a grass catcher support structure.
Figure 8:
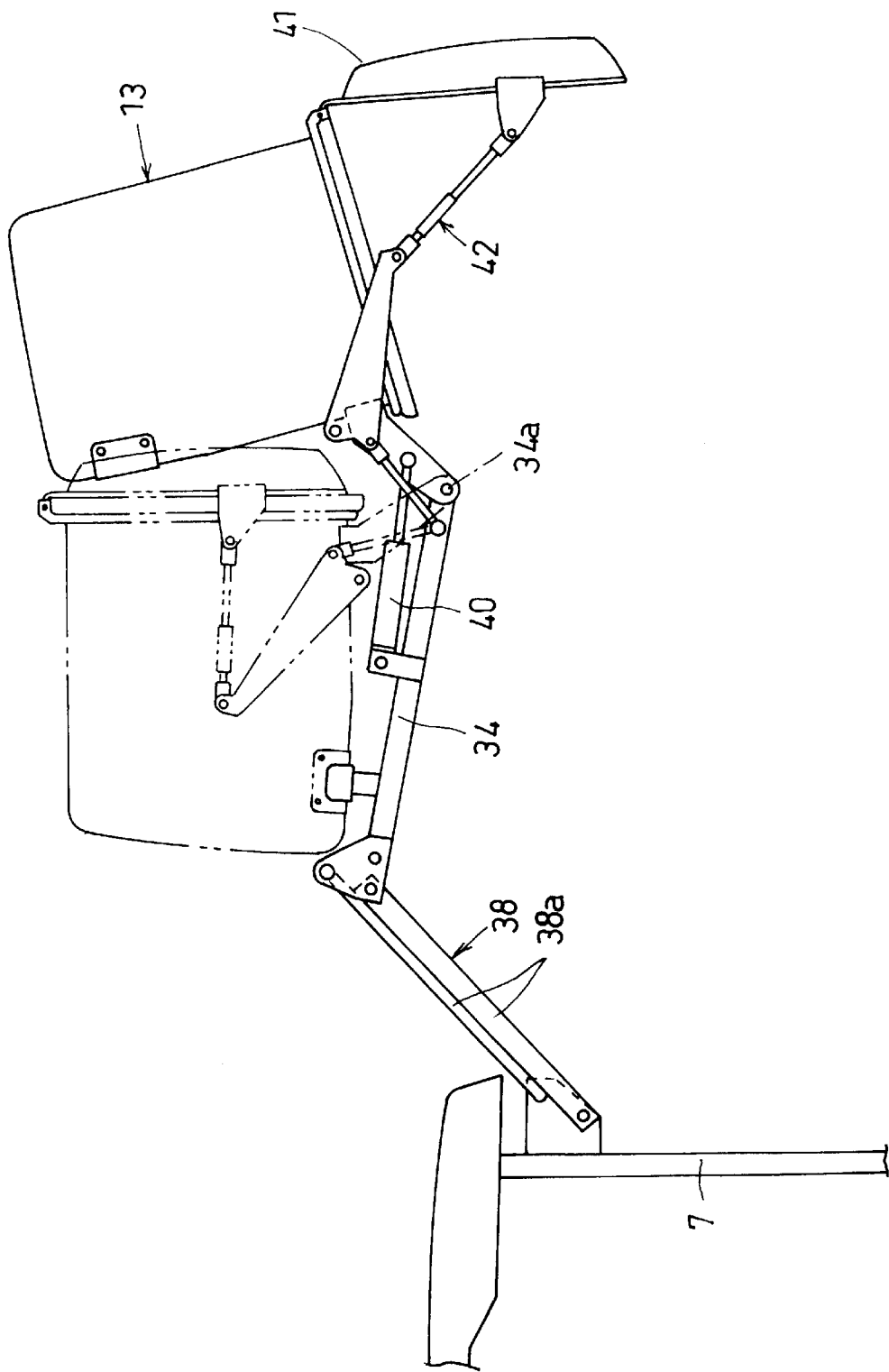
FIG. 8 is a side view showing the grass catcher in a raised position.

As shown in FIGS. 7, 8 and so on, the grass catcher 13 is connected to posts of the driving platform frame 7 through a support frame 34 pivotally supporting the grass catcher 13 to be pivotable about an axis 34a, and a link mechanism 38 having a pair of pivot links 38a connected at distal ends thereof to the support frame 34.

The grass catcher 13 is swung about the axis 34a, by a driving force of a dump cylinder 40 attached to the support frame 34, between a collecting position with a discharge opening directed rearward and a discharging position with the discharge opening directed downward. The grass catcher 13 has a lid 41 pivotally attached thereto for closing the discharge opening. By the action of a link mechanism 42 extending between the lid 41 and the support frame 34, the lid 41 is automatically opened when the grass catcher 13 pivots to the discharging position, and automatically closed when the grass catcher 13 pivots to the collecting position.

When a lift cylinder (not shown) included in the link mechanism 38 is not operated, i.e., when the link mechanism 38 maintains its vertical orientation, the grass catcher 13 has a discharging position nearly at the level of the collecting position, which is called a low dump system (See Fig.7). When the lift cylinder (not shown) is operated, i.e., the link mechanism 38 turns to a slanting position, the grass catcher 13 has a discharging position far higher than the collecting position, which is called a high dump system (See FIG. 8).

Figure 9A:
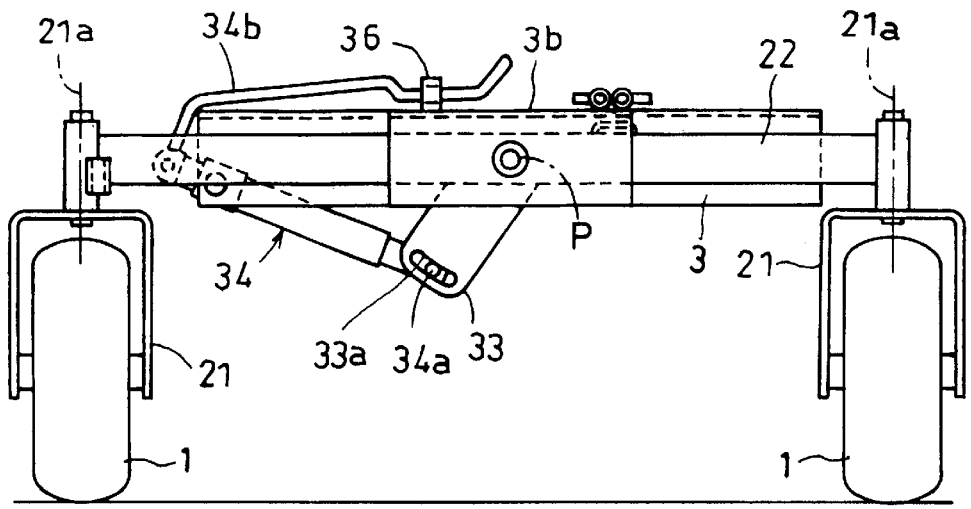
FIGS. 9A and 9B are front views showing a mounting structure of a front axle member, and a jack mechanism.

As shown in FIG. 9A, the front axle member 22 is pivotally attached in the middle position thereof, by a connecting rod 32, to a front wheel support member 3b formed by placing a bracket on the front end portion of the body frame 3. Thus, the front axle member 22 is capable of rolling relative to the self-propelled vehicle body about the axis of connecting rod 32 extending longitudinally of the vehicle body.

A jack-up device includes a control member 33 extending from the middle position of the front axle member 22 to swing the front axle member 22, and a screw-type jack mechanism 34. One end of the jack mechanism 34 is connected to the control member 33 by a connecting pin 34a slidably inserted into a rolling slot of the control member 33, while the other end is connected to the front end of the body frame 3.

When the vehicle travels on a terrain sloping transversely of the vehicle body, or one front wheel 1 rides on a mound or falls into a hollow, the front axle member 22 rolls relative to the body frame 3, within a range that the control member 34 is allowed to move relative to the jack mechanism 34 by the rolling slot 34a. Thus, the right and left front wheels 1 are variable in the height of attachment to the body frame 3 to maintain the vehicle body horizontal or nearly horizontal in the transverse direction during a grass cutting operation.

Figure 9B:
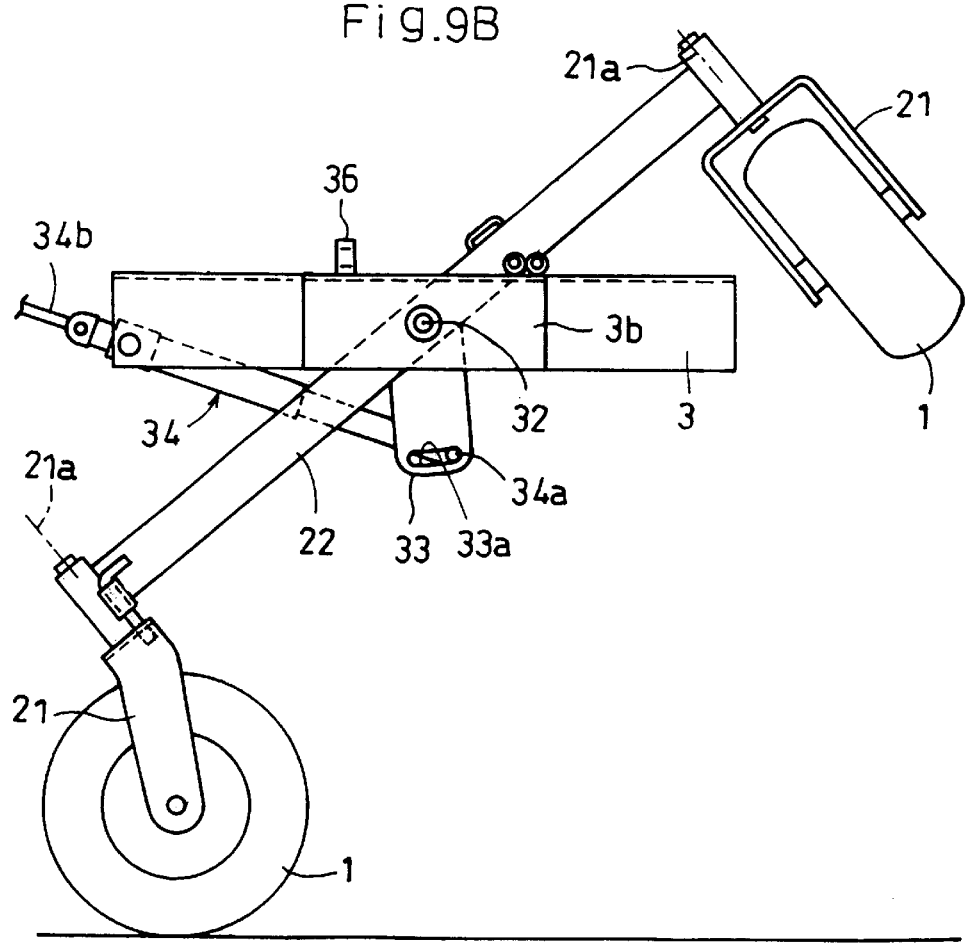

When inspecting the inside of mower deck 11a of the mower unit 11, for example, the operator removes a cover 35 (FIG. 1) covering upper and forward portions the front wheel support member 3b, to open up an area above the front wheel support member 3b for allowing one end of the front axle member 22 to be raised. As shown in FIG. 9B, a control handle 34b is taken off a holder 36 disposed on the body frame 3 and turned to extend the jack mechanism 34. Then, the extending force of the jack mechanism 34 swings the front axle member 22 relative to the body frame 3, lifting the front of the vehicle body by using the front wheel in a downward position as a grounding member. As a result, the front end of mower unit 11 is lifted to open the inside of the mower deck 11a forwardly.

[Other Embodiments]

Figure 10:
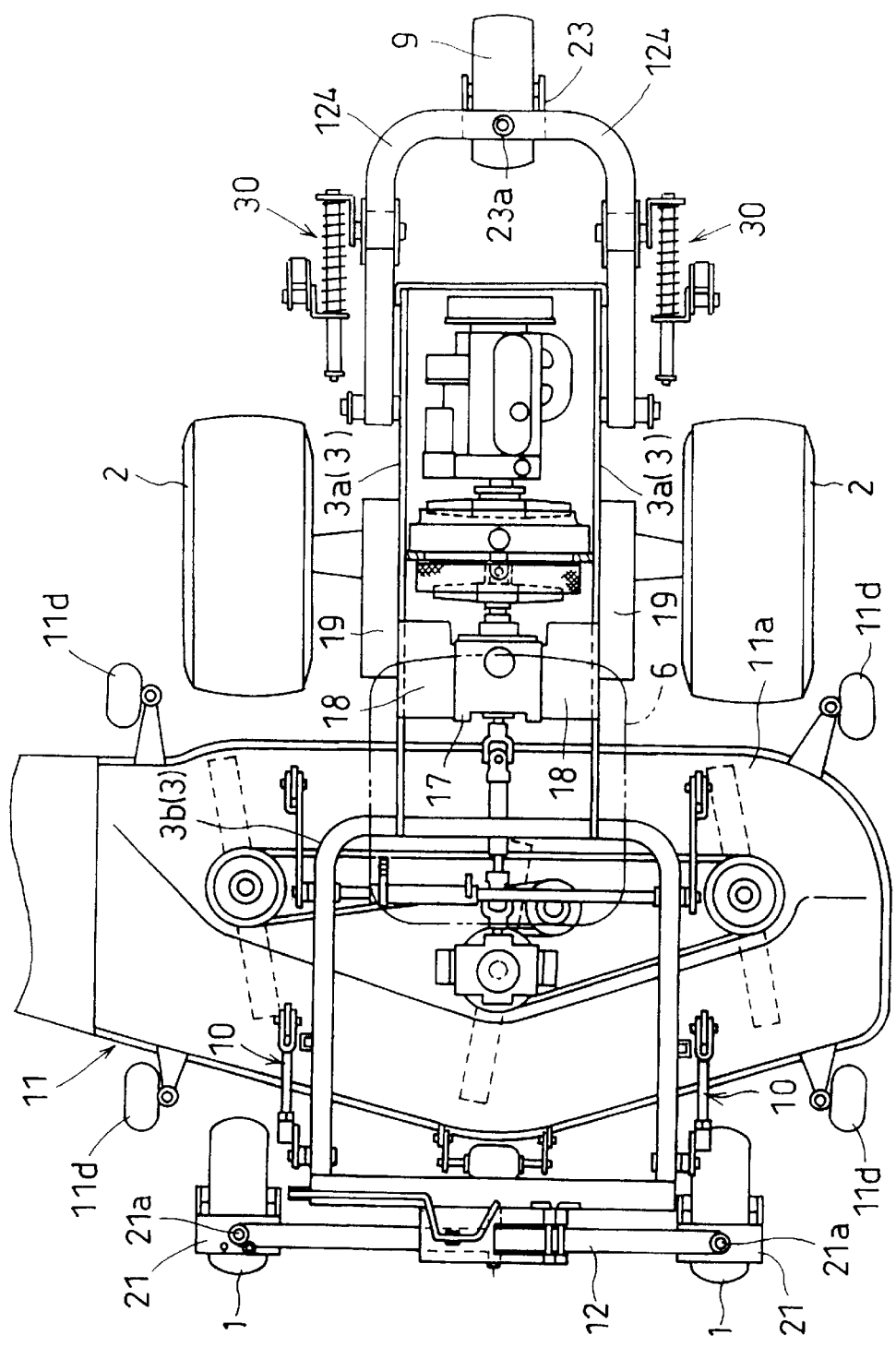
FIG. 10 is a plan view showing a support member of the auxiliary ground wheel in another embodiment.

(1) FIG. 10 shows another embodiment of the support member for supporting the auxiliary ground wheel 9. While the auxiliary ground wheel 9 consists of a single wheel, a support member 124 for supporting the auxiliary ground wheel 9 is formed as a U-shaped arm, and the auxiliary ground wheel 9 is attached to the middle portion thereof. A pair of the suspension springs 30 are disposed as a biasing mechanism (braking mechanism), one each on the right and left sides of the U-shaped arm.

Figure 11:
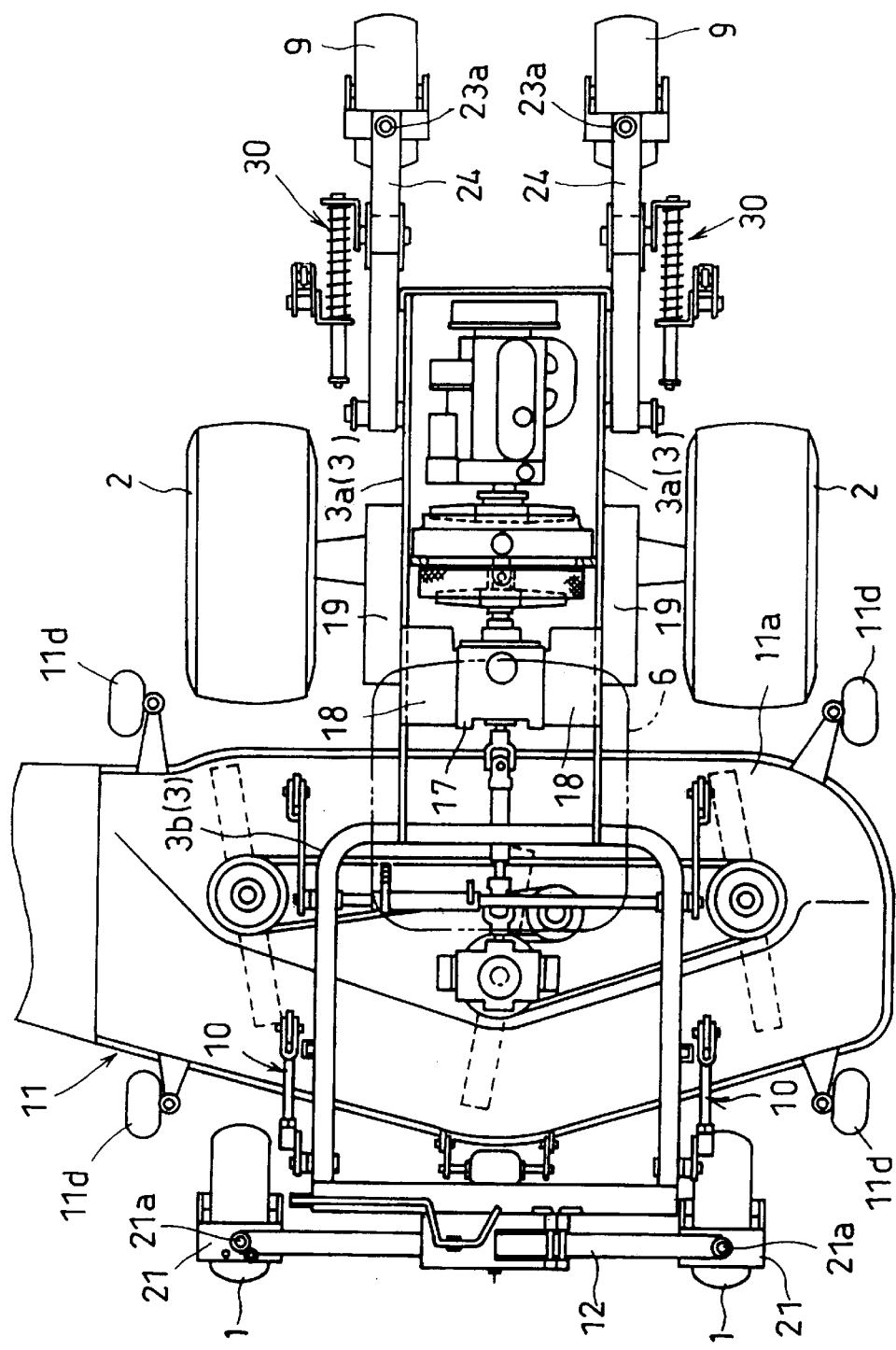
FIG. 11 is a plan view showing a support member of the auxiliary ground wheel in yet another embodiment.

(2) FIG. 11 shows yet another embodiment of a support member for supporting the auxiliary ground wheel 9. A pair of right and left auxiliary ground wheels 9 are disposed, and each auxiliary ground wheel 9 has substantially the same support member 24 and suspension spring 30, the latter acting as a biasing mechanism, as in the first embodiment. As the biasing mechanism (braking mechanism), coil springs mounted on pivot shafts, or dampers or gas springs may be employed in place of the suspension springs.

Figure 12:
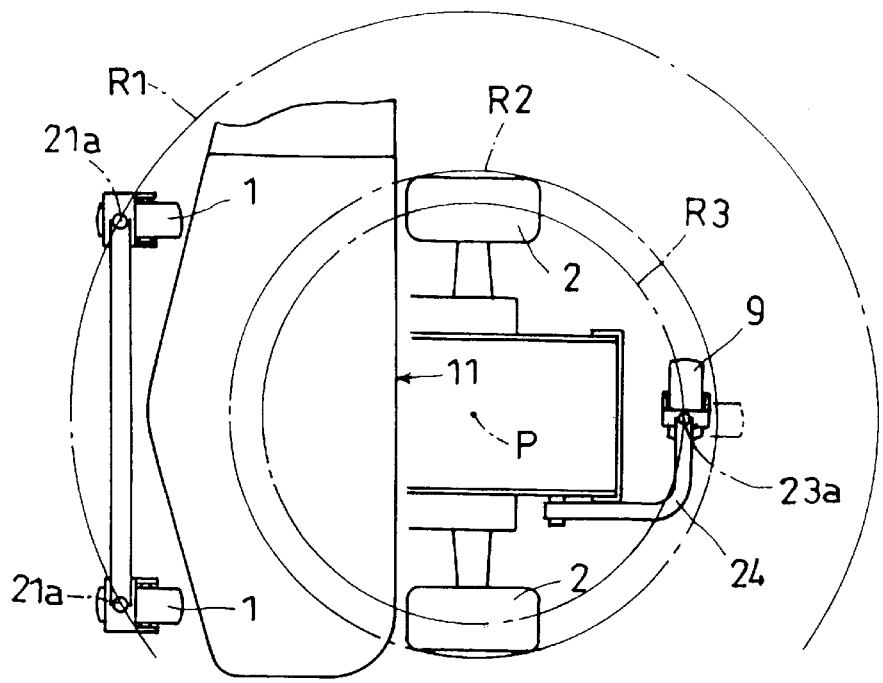
FIG. 12 is a schematic plan view of a lawn mower in another embodiment.

(3) FIG. 12 shows another embodiment relating to the layout of the auxiliary ground wheel 9. In this mower, when the right and left rear wheels 2 are driven at the same speed in opposite directions to steer the self-propelled vehicle to turn about the center P in the middle position on the rear wheel axis between the right and left rear wheels 2 in plan view, the auxiliary ground wheel 9 turns with a radius R3 which is smaller than the turning radius R1 of the right and left front wheels 1 and does not exceed the turning radius R2 of the right and left rear wheels 2.

Figure 13:
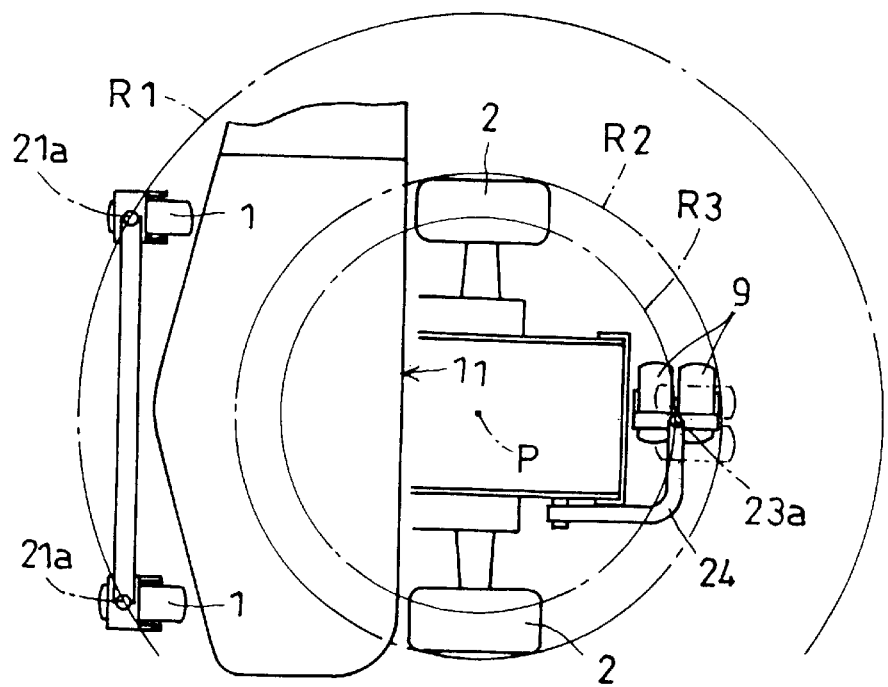
FIG. 13 is a schematic plan view of a lawn mower in a further embodiment.
Figure 14:
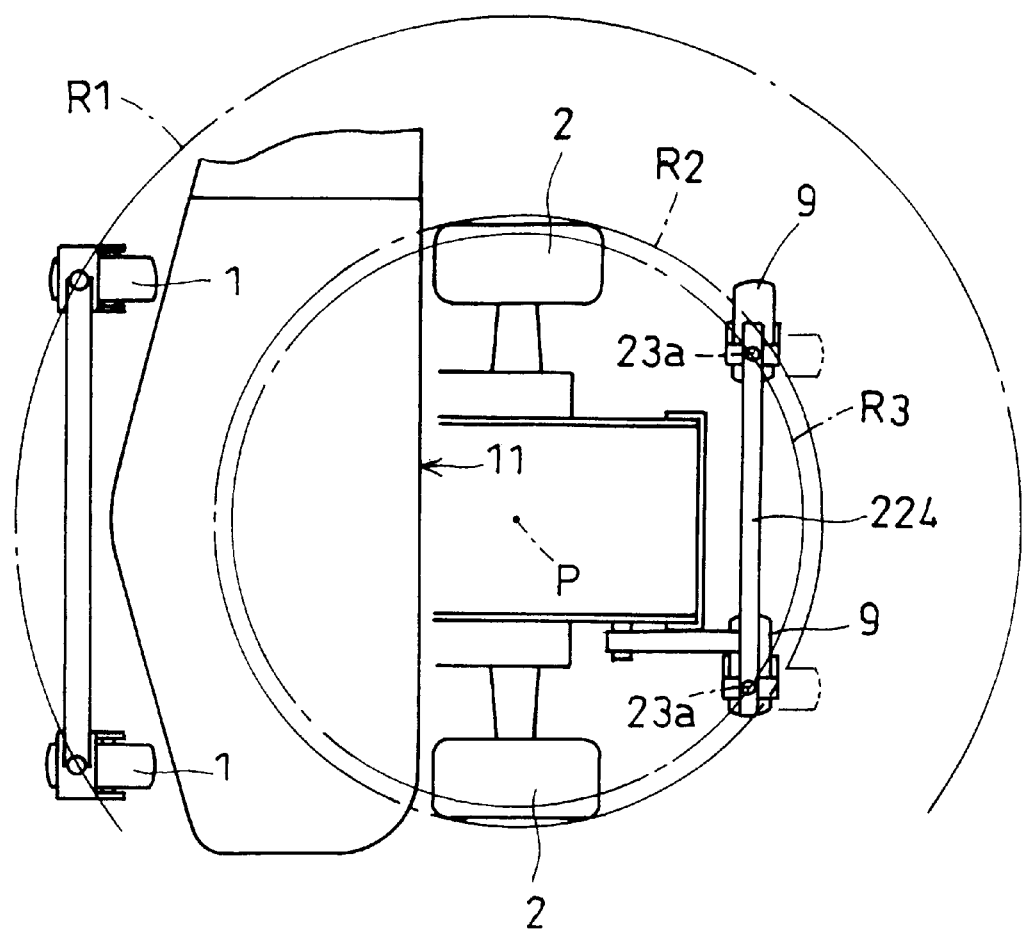
FIG. 14 is a schematic plan view of a lawn mower in a still further embodiment.

(4) FIGS. 13 and 14 show further embodiments relating to the layout of auxiliary ground wheels 9. Each of these mowers has a pair of right and left auxiliary ground wheels 9. When the right and left rear wheels 2 are driven at the same speed in opposite directions to steer the vehicle to turn about the center P in the middle position on the rear wheel axis between the right and left rear wheels 2 in plan view, the auxiliary ground wheels 9 turn with a radius R3 which is smaller than the turning radius R1 of the right and left front wheels 1 and does not exceed the turning radius R2 of the right and left rear wheels 2.

In the mower shown in FIG. 13, the right and left auxiliary ground wheels 9 are supported to be pivotable about one steering axis 23a relative to an auxiliary ground wheel support arm 24.

In the mower shown in FIG. 14, the right and left auxiliary ground wheels 9 are supported to be pivotable about individual steering axes 23a relative to an auxiliary ground wheel support arm 24. Even with the pair of right and left auxiliary ground wheels 9 installed, the turning radius R3 of the two auxiliary ground wheels 9 is smaller than the turning radius R1 of the right and left front wheels 1 and does not exceed the turning radius R2 of the right and left rear wheels 2.

What is claimed is:

1. A lawn mower comprising:

a vehicle body;

an engine mounted on said vehicle body;

caster-type front wheels;

a rear wheel unit having a left rear drive wheel and a right rear drive wheel;

a left stepless transmission for transmitting drive, switched between forward drive and backward drive, to said left rear wheel;

a right stepless transmission for transmitting drive, switched between forward drive and backward drive, to said right rear wheel;

said right and left stepless transmissions being operable independently of each other;

a mower unit disposed between said front wheels and said rear wheel unit;

a caster-type auxiliary ground wheel unit disposed rearwardly of said rear wheel unit;

a support member for supporting said auxiliary ground wheel unit to be vertically movable relative to said vehicle body; and a braking mechanism for braking an upward movement of said support member.

2. A lawn mower as defined in claim 1, wherein said braking mechanism is constructed as a biasing mechanism for biasing said auxiliary ground wheel unit downward.

3. A lawn mower as defined in claim 2, wherein said biasing mechanism comprises a suspension spring for biasing said auxiliary ground wheel unit downward.

4. A lawn mower as defined in claim 1, wherein said auxiliary ground wheel unit comprises a single ground wheel.

5. A lawn mower as defined in claim 1, wherein said auxiliary ground wheel unit comprises a plurality of ground wheels arranged transversely of the vehicle body.

6. A lawn mower as defined in claim 1, wherein said support member includes a proximal arm portion extending longitudinally of said vehicle body and laterally outwardly of said engine and having a front end thereof connected to a body frame to be pivotable about an axis extending transversely of the vehicle body, and a distal arm portion extending transversely of the vehicle body from a rear end of said proximal arm portion, with an extended end having said auxiliary ground wheel unit attached thereto.

7. A lawn mower as defined in claim 6, wherein said proximal arm portion is disposed laterally of the vehicle body opposite from a side where a blower is disposed for transmitting grass clippings into a grass catcher.

8. A lawn mower as defined in claim 6, wherein said proximal arm portion is disposed laterally of the vehicle body opposite from a side where a grass outlet of said mower unit is disposed.

9. A lawn mower as defined in claim 1, wherein said support member comprises a U-shaped arm having said auxiliary ground wheel unit attached to an arm portion remote from an open end of the U-shaped arm.

10. A lawn mower as defined in claim 1, wherein said auxiliary ground wheel unit is disposed such that said auxiliary ground wheel unit describes a turning track within a maximum turning track of the lawn mower when said right and left rear wheels are driven at an equal speed in opposite directions to steer the vehicle body.

11. A lawn mower as defined in claim 10, wherein said auxiliary ground wheel unit is disposed such that said auxiliary ground wheel unit describes a turning track not exceeding a turning radius of said right and left rear wheels when said right and left rear wheels are driven at an equal speed in opposite directions to steer the vehicle body.

12. A lawn mower as defined in claim 10, wherein said auxiliary ground wheel unit is disposed such that said auxiliary ground wheel unit describes a turning track not exceeding a turning radius of said front wheels when said right and left rear wheels are driven at an equal speed in opposite directions to steer the vehicle body.

* * * * *